US007350309B2

(12) United States Patent
Hermann et al.

(10) Patent No.: US 7,350,309 B2

(45) Date of Patent: Apr. 1, 2008

(54) EXTENDABLE SPACER DEVICE

(75) Inventors: Michael Hermann, Villingen (DE); Werner Landmann, Ismaning (DE)

(73) Assignee: Pruftechnik Dieter Busch AG, Ismaning (DE)

( * ) Notice: Subject to any disclaimer, the term of this patent is extended or adjusted under 35 U.S.C. 154(b) by 48 days.

(21) Appl. No.: 11/279,422

(22) Filed: Apr. 12, 2006

(65) Prior Publication Data

US 2006/0225294 A1 Oct. 12, 2006

(30) Foreign Application Priority Data

Apr. 12, 2005 (DE) ..................... 10 2005 017 053

(51) Int. Cl.
*G01D 21/00* (2006.01)
*B23Q 3/00* (2006.01)

(52) U.S. Cl. ........................... 33/520; 33/542; 33/645; 33/644; 248/172; 269/289 MR

(58) Field of Classification Search ................. 33/520, 33/644, 412, 452, 453, 456, 463, 673, 542, 33/543, 544.5, 544.6, 546, 550, 551, 552, 33/555.1, 286, DIG. 21, 544, 544.1, 645, 33/613, 657, 203.18, 203.19; 248/688, 671, 248/676, 151, 436, 172, 287.1, 298.1, 274.1; 269/289 MR, 48.1, 52; 356/153, 152.1, 356/635

See application file for complete search history.

(56) References Cited

U.S. PATENT DOCUMENTS 1,403,156 A * 1/1922 Gonzalez .................. 33/23.02
2,304,045 A * 12/1942 Anderson et al. ........... 362/139
2,325,362 A * 7/1943 Black, Sr. ................ 33/203.19
2,464,070 A * 3/1949 Carcelli ..................... 33/544.6
2,478,609 A * 8/1949 Townsley ................... 356/127
2,485,325 A * 10/1949 Sloane ....................... 280/641
2,607,012 A * 8/1952 Siebert ........................ 378/60
3,907,435 A * 9/1975 Roodvoets ................. 356/153
3,984,627 A * 10/1976 Galerne ....................... 348/85
4,677,865 A * 7/1987 Lehmann ................... 73/866.5
4,843,896 A * 7/1989 Napeloni et al. .......... 73/866.5
4,872,267 A * 10/1989 Anderton ..................... 33/463
4,878,296 A * 11/1989 Londino, Jr. ................. 33/227
5,074,051 A * 12/1991 Cordy et al. .................. 33/520
5,426,507 A * 6/1995 Rando ........................ 356/399
5,461,793 A * 10/1995 Melville ...................... 33/286
5,565,633 A * 10/1996 Wernicke ................... 73/865.8
5,732,474 A * 3/1998 Cannon ....................... 33/452
6,237,501 B1 * 5/2001 Miller et al. .................. 104/91
6,342,946 B1 1/2002 Holstein
6,931,748 B2 * 8/2005 Lam et al. .................... 33/544

(Continued)

*Primary Examiner*—G. Bradley Bennett
*Assistant Examiner*—Amy Cohen Johnson
(74) *Attorney, Agent, or Firm*—David S. Safran

(57) ABSTRACT

A spacer device for laser-optical measurement of hollow cylinders has at least two, preferably three arms which are coupled or interlaced with one another and which can be moved relative to one another. Each of the arms has a measurement roller on one end which is brought into contact with the inner surface of a hollow cylinder to be measured and which can be rolled thereon, if necessary. An instrument platform is attached to the spacer device so that a light emitter (e.g., laser) and/or receiver or reflector can be attached at the central position of the instrument platform. The device is used to determine the three-dimensional position of the hollow cylinder to be measured.

10 Claims, 5 Drawing Sheets

U.S. PATENT DOCUMENTS

D514,612 S * 2/2006 Boele ........................ D16/235
7,086,169 B1 * 8/2006 Bayham et al. ............... 33/550
2006/0196060 A1 * 9/2006 Suing et al. .................. 33/286

* cited by examiner 28
27
29
30
B''
B'
36
22
16
20
32
C
26
12
B
24
A
10

222
220
223
280
210
284
273
290
282
271
288
274
230

EXTENDABLE SPACER DEVICE

BACKGROUND OF THE INVENTION

1. Filed of the Invention

This invention relates to an extendible spacer device that is especially suited to use as a spacer piece used to measure hollow cylinders and their relative position to a reference axis.

2. Description of Related Art

An extendable spacer device used to measure hollow cylindrical articles of the type to which the present invention is directed is disclosed in European Patent EP 1083402 B and corresponding U.S. Pat. No. 6,342,946, reference is made to avoid repetition.

SUMMARY OF THE INVENTION

A primary object of the invention is to devise a spacer device for measuring hollow cylinders which, in a simple and still mechanically stable manner, can be adapted to different diameters of the hollow cylinder, and which is characterized by a significant cost advantage as compared to commercially available devices of this type.

This object is achieved according to preferred embodiments of the invention in that there is an arrangement with exactly three arms, the arms being cyclically coupled into one another by means of slots and/or bridges or comparable construction elements and being movable relative to one another while maintaining a relative angle of roughly 60° with respect to one another. Preferably, there are one or more measurement wheels or rollers attached to the respective end of one arm for making contact with the surface of a hollow cylinder to be measured. In particular, in another configuration of the invention, two such arrangements are mounted in the axial direction with the aid of three braces, connecting pieces or the like, i.e., are combined with one another into a unit which extends in the axial direction, so that the residual axial tilt angle of the arrangement within a hollow cylinder to be measured is reduced.

The spacer device can be made of a solid material or is produced by joining halves or portions of individual component pieces. Advantageously, the spacer device is composed of parts which are cut out of aluminum or steel hollow sections of rectangular cross section. Figure The invention is explained in further detail below with reference to the accompanying drawings.

DETAILED DESCRIPTION OF THE INVENTION

Figure 1:
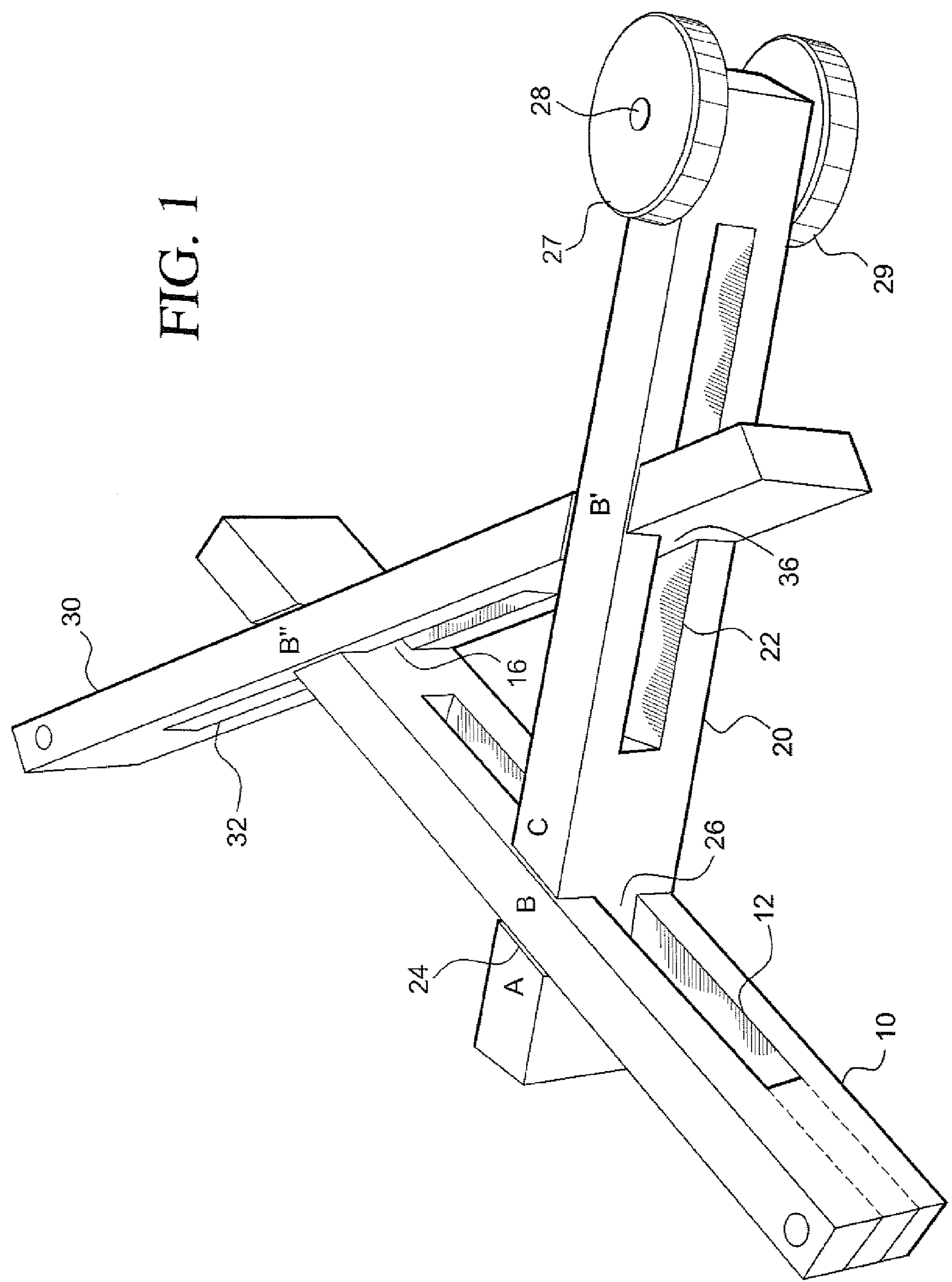
FIG. 1 is a perspective view of a spacer device in accordance with the invention.

FIG. 1 shows a first embodiment of a spacer device that can be rotated within a hollow cylinder around its center axis (see U.S. Pat. No. 6,342,946 for the manner in which such is performed, which patent is hereby incorporated by reference). The spacer device has measurement wheels, rollers or the like 27, 29, preferably a total of 6 of these wheels, of which only 2 are shown in the figure and the remainder can be analogously mounted on the end of arms 10, 30 by means of an axle 28 in the same manner shown for arm 20. The measurement wheels are preferably made as ball bearings. There are exactly three arms, so that exact matching of the wheels to the contour and surface of a hollow cylinder to be measured can be performed.

The three arms 10, 20, 30 are arranged to be able to move relative to one another. For this purpose, slots 24 and bridges 16, 26, 36 are machined into each of the individual arms 10, 20, 30, respectively. The slots 24 must be much broader than the corresponding dimension of the respective arm, so that sticking of the arms against one another is avoided when the spacer device is to be extended or retracted to match the diameter of the hollow cylinder to be measured, or parts thereof.

To fix the position of the arms relative to one another, there is a clamping device (not shown) which is made, for example, in the form of one or more clips which can be attached at points A and C, and can have a clamping screw which make contact with point B to secure the arms relative to one another. With identical clamping devices, contact can also be made with points B' or B".

Within the triangle formed by the arms 10, 20, 30, a measurement sensor or a measurement device, or a light beam emitter, especially a laser emitter, can be attached. Instead of a light beam emitter, there can be a light reflecting device or another optical element, for example, a reflecting glass prism.

It is apparent that the illustrated embodiment has a comparatively high stability at low material cost and weight.

Figure 2:
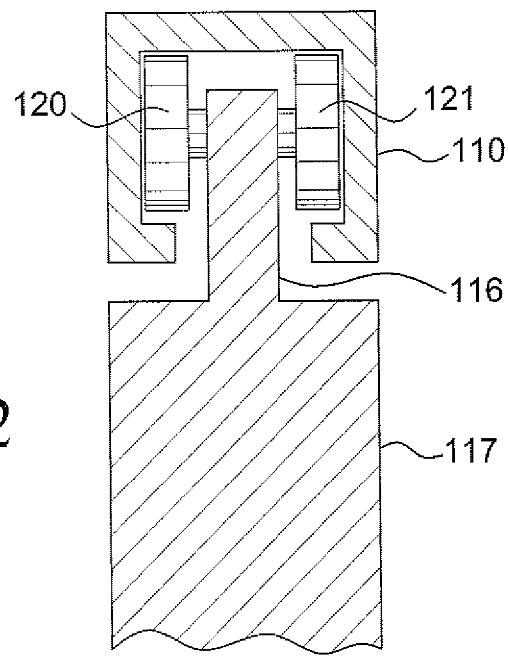
FIG. 2 is a partial cross-sectional view showing the manner of connecting spacer arms in accordance with another embodiment of the invention
Figure 3:
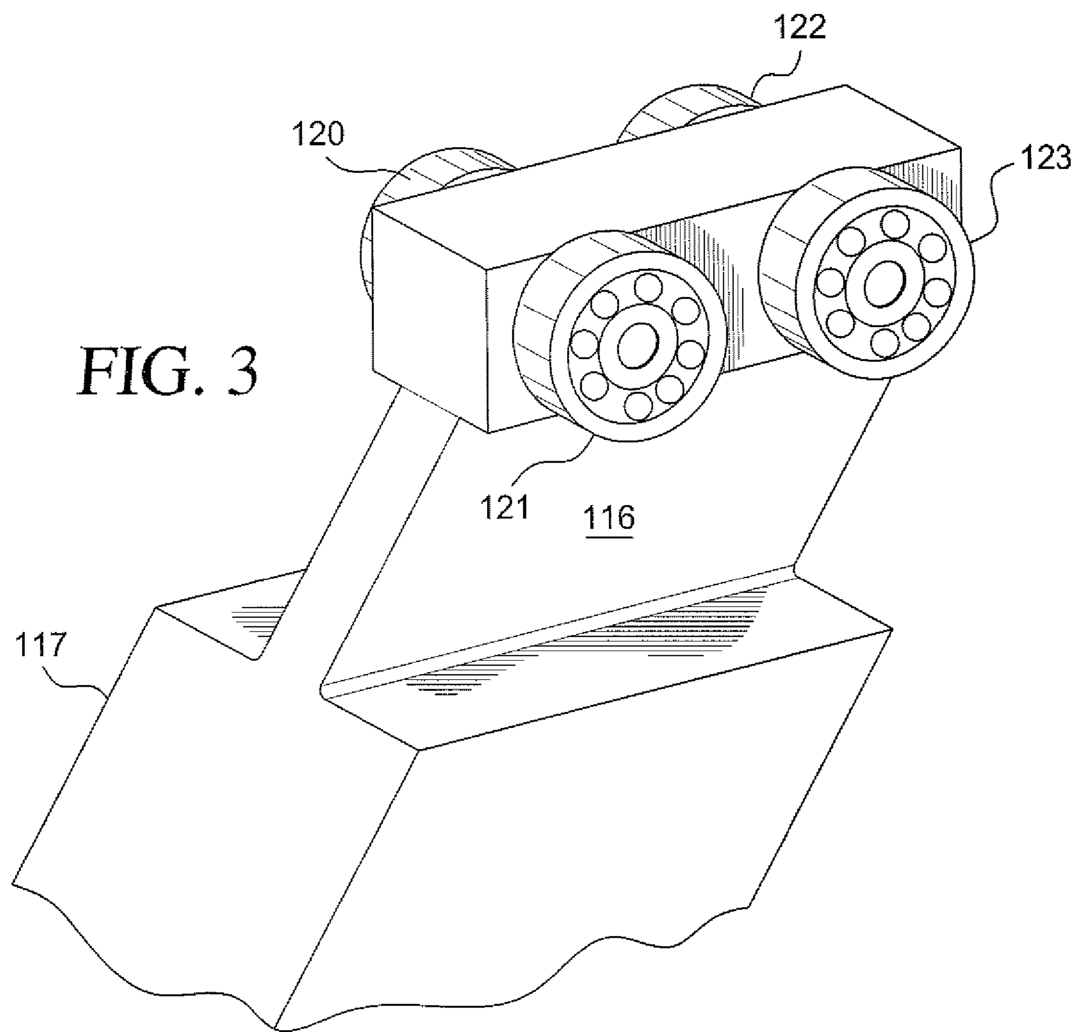
FIG. 3 is a perspective view showing the end of a spacer arm of the FIG. 2 embodiment.

In another embodiment of the invention, provision is made for the arms of the device to be able to be shifted relative to one another and thus extended or retracted with as little friction as possible. As FIGS. 2 & 3 show, the arms of the spacer device are produced from a slotted hollow section 110 (a so-called C-section) and are movable relative to one another by means of ball bearing rollers 120, 121, 122, 123 or other suitable wheels. The ball bearing rollers are each supported by means of a suitable bridge part 116. Each arm 110 is equipped with such a bridge part 116 together with the respective ball bearing rollers 120, 121, 122, 123. FIG. 3 shows a perspective view of a suitable arrangement of this type. As is apparent, the bridge part 116 is preferably made from a solid material. It has suitable mounting devices, additional pieces 117 or holes so that it can be mounted on an end of an arm 110, etc.

Figure 4A:
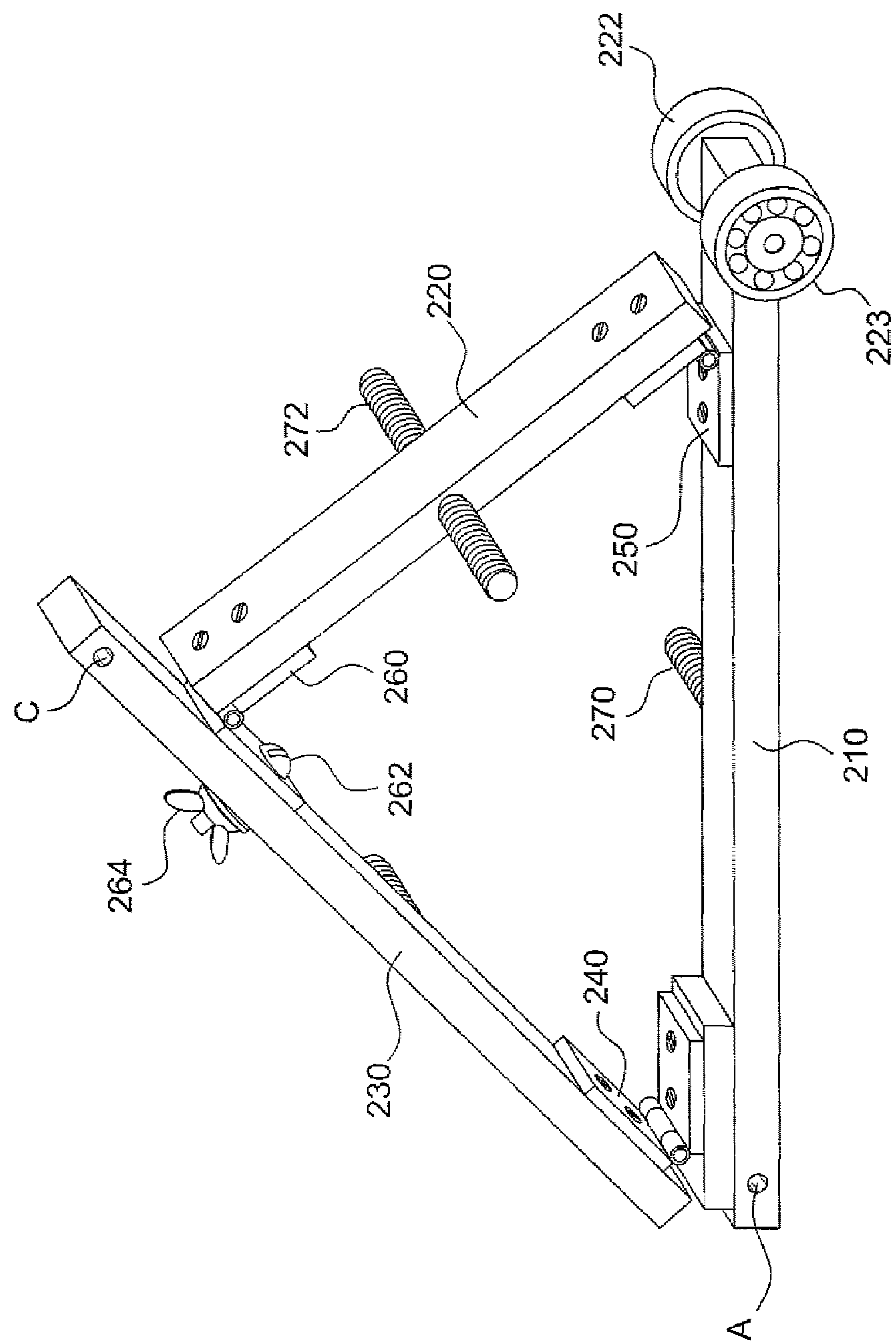
FIGS. 4A & 4B are perspective views showing two other embodiments of a spacer device in accordance with the invention.
Figure 4B:
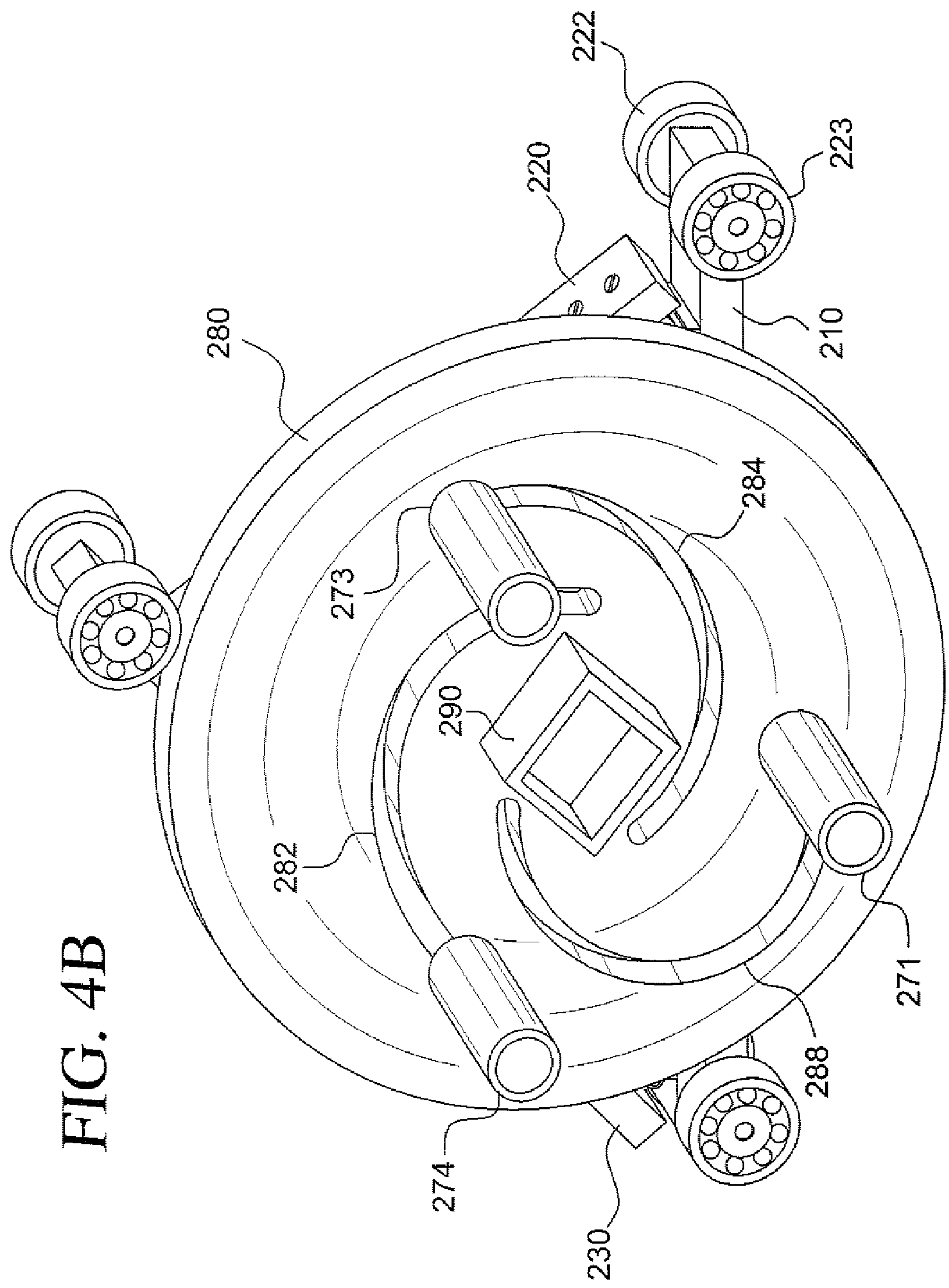

Another embodiment of the invention is shown in FIGS. 4A & 4B. This spacer device has a smaller capacity for extension of the effective perimeter radius, for example, of roughly 1 to 2% of the arm lengths. As in the previous embodiments, the wheels, measurement rollers or ball bearings for rolling within the hollow cylindrical measurement surface are located on the end of the arms, in this case, the arms 210, 220, 230. In FIG. 4A, only measurement rollers 222, 223 are shown; other corresponding measurement rollers are provided at points A and C. The arms 210, 220, 230 are held to be able to pivot against one another with hinges 240, 250, 260. The arm 230 can be provided, for example, with slots or elongated holes so that by means of a combination of one or more screws 262 and wing nuts or the like 264, the effective length of the sides of the spacer device can be varied to a certain extent. For constricted space conditions, a correspondingly effective locking device can also be operated from the side of the triple-arm arrangement. Pins 270, 272 and others (not shown) are used for holding and locking (for example, likewise by means of wing nuts, not shown) of an instrument platform. On this instrument platform, there can be light transmitters, preferably in the form of green luminous laser beam devices which emit in the axial direction of the hollow cylinder to be measured, or two-dimensionally sensing light receiving devices. The latter are connected in the known manner to the pertinent electronic evaluation devices. It is advantageous if the instrument platform is equipped with electronic inclinometers so that the rotational position of the spacer device within the hollow cylinder can be sensed. In the measurement of hollow cylinders which are not horizontally aligned, the measured value of these inclinometers can be converted by means of a correction function to the actual angle -of rotation of the instrument platform relative to the axis of the hollow cylinder to be measured.

Other or corresponding configurations of the invention are shown in FIG. 4B, where in addition to the arms 210, 220, 230 which are equipped with measurement wheels or rollers an instrument platform 280, here, for example, in the form of a round disk, is shown. Advantageously, the instrument platform 280 has elongated holes or slots 282, 284, 288 which are arranged in a spiral and through which the indicated pins 270, 272, etc. are inserted. The pins, therefore also the arms 210, etc., can then be stably fixed by means of tension nuts 271, 273, 274, relative to the instrument platform 280.

Furthermore, FIG. 4B shows how an optical element, for example, a reflecting prism 290 (also known as a right angle prism) is interchangeably centrally mounted securely on the instrument platform 280.

In another embodiment of the invention, there is a device which relates to a modification of the arrangement shown in FIGS. 4A & 4B. According to this modification, there are only 2 arms 210, 230 which are hinged together or the like, as in FIG. 4. Likewise, at positions A and C and on the other end of the arm 210 the corresponding precision rollers 222, 223 are mounted, preferably, but not necessarily, in pairs. Furthermore, there are fasteners similar to 270, 272 in FIG. 4A, to which one or more, preferably flat instrument platforms can be attached, which are especially suited to functioning as adapters for a light beam emitter.

In order for all precision rollers to stably adjoin the hollow cylinder to be measured, there are one or more components with spring action. This component or spring acts on the arms 210, 230 in an extensible manner so that there is always the best possible contact of the precision rollers with the hollow cylinder. In this way, the measurement of hollow cylinders with a variable cross-sectional surface or not completely round cross section is possible. It is advantageous to place the component with spring action in the vicinity of the hinge or the like 240. Moreover, there are other attachment possibilities for such a component with spring action, for example, attachment of one end to at least one intended instrument platform. The other end of the spring can act on one or both arms 210, 230. This component with spring action (spring) is thus suited to exerting a spreading force on the arms (210, 230). As a result, the arms of the device of the invention make contact essentially with the surface to be measured by means of precision rollers without play, also at those points where their shape deviates from the ideal shape.

Figure 5:
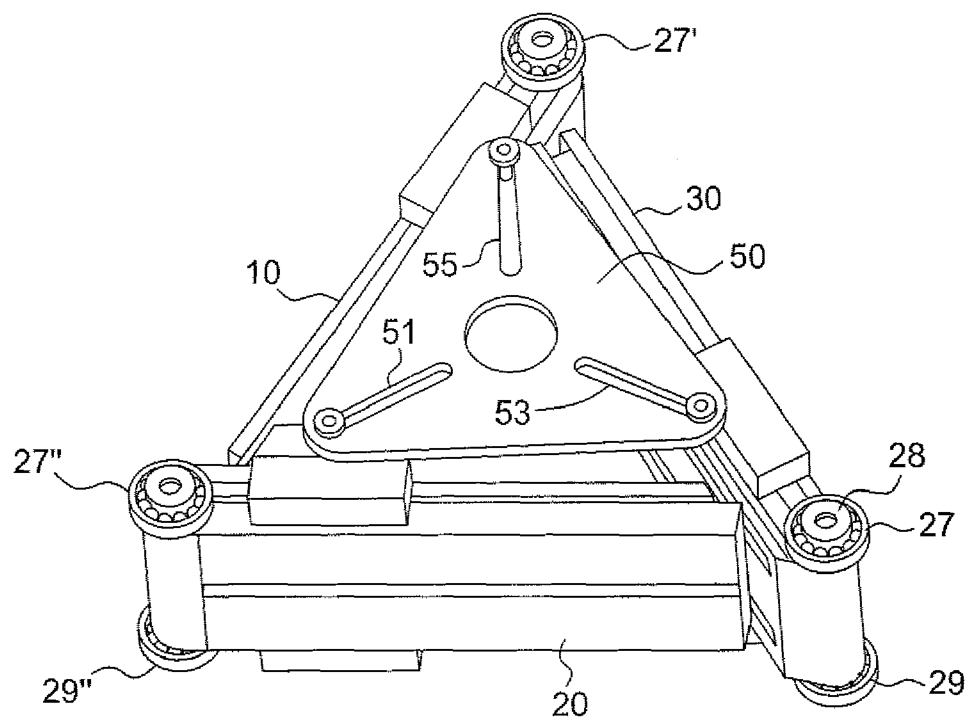
FIGS. 5 & 6 are perspective views showing another embodiment of a spacer device in accordance with the invention in expanded and contracted states, respectively
Figure 6:
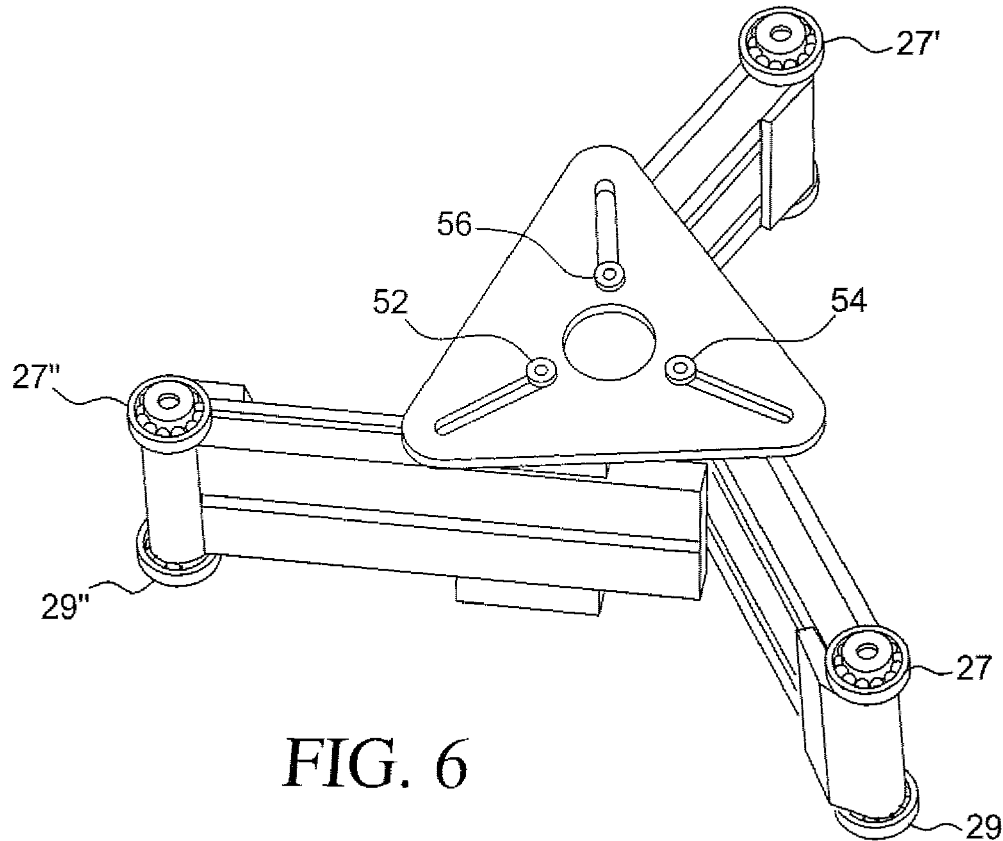

FIGS. 5 & 6 show a preferred embodiment of the invention in the contracted and expanded states. The arms 10, 20 & 30 are produced from a suitable extruded aluminum section and the measurement rollers 27, 29 correspond to those of FIG. 1. The instrument platform 50 is provided with elongated holes 51, 53, 55 which, in interplay with locking screws 52, 54, 56, likewise, cause fixing of the arms 10, 20, 30 relative to one another. There are rollers in the form of ball bearing rollers similar to those from FIG. 2. In any case, the slot shown in FIG. 2 is present twice per arm for the bridge-like holders on each of the side surfaces of the arms 10, 20, 30.

What is claimed is:

1. Spacer device for measurement of the position of hollow cylinders, comprising an arrangement of exactly three arms each of which is coupled to the other two arms and which can be moved relative to one another, and at least one measurement wheel or roller attached to an end of each arm and having a radially directed rolling surface for making contact with an inner surface of a hollow cylinder to be measured, and fastening devices for mounting at least one of an instrument platform and a means for emitting or receiving light beams or an optical component.

2. Spacer device as claimed in claim 1, wherein the coupling of the arms enables said movement of the arms relative to one another while maintaining an angle of about 60° between each pair of said arms.

3. Spacer device as claimed in claim 1, wherein each of the arms is connected to each of the other arms by means of at least one of slots and bridges.

4. Spacer device as claimed in claim 3, wherein said arms are made of aluminum or steel tube sections that have a rectangular cross section.

5. Spacer device as claimed in claim 3, wherein said arms have a lengthwise slit.

6. Spacer device as claimed in claim 3, further comprising at least one mount suitable for central holding of at least one of a light beam emitter and a measurement device.

7. Spacer device as claimed in claim 3, wherein ball bearing means for establishing contact between arms that are connected to each other are attached to ends of the arms for providing easy movability and motion of the arms relative to one another.

8. Spacer device as claimed in claim 1, wherein each of the three arms is connected to the other arms by a respective hinge.

9. Spacer device as claimed in claim 8, further comprising a screw and nut combination having a screw guided in an elongated slot for varying an effective perimeter radius of the arms and a nut for fixing the arms in positions in which they have been set.

10. Spacer device as claimed in claim 1, wherein each of the three arms is connected to the other arms by a respective hinge, and at least one spring action component which exerts a spreading force on the arms.

* * * * *